United States Patent [19]
Ohtsuka et al.

[11] Patent Number: 6,121,386
[45] Date of Patent: Sep. 19, 2000

[54] RESIN COMPOSITIONS FOR COATING

[75] Inventors: Yoshihiro Ohtsuka; Yoshihiro Oshino, both of Otake, Japan

[73] Assignee: Daicel Chemical Industries, Ltd., Osaka, Japan

[21] Appl. No.: 09/101,851

[22] PCT Filed: Nov. 19, 1996

[86] PCT No.: PCT/JP96/03386

§ 371 Date: Jul. 20, 1998

§ 102(e) Date: Jul. 20, 1998

[87] PCT Pub. No.: WO98/22546

PCT Pub. Date: May 28, 1998

[51] Int. Cl.$^7$ .................................................. C08G 65/32
[52] U.S. Cl. ........................................ 525/408; 524/386
[58] Field of Search .............................. 525/408; 524/386

[56] References Cited

U.S. PATENT DOCUMENTS

| 5,334,662 | 8/1994 | Ochi | 525/90 |
| 5,382,604 | 1/1995 | Erickson | 522/158 |
| 5,449,718 | 9/1995 | Erickson | 525/314 |
| 5,491,193 | 2/1996 | Erickson | 525/65 |
| 5,567,781 | 10/1996 | Martino | 525/438 |
| 5,686,535 | 11/1997 | Erickson | 525/314 |

FOREIGN PATENT DOCUMENTS

| 0688823 | 12/1995 | European Pat. Off. . |
| 6-172731 | 6/1994 | Japan . |
| 6-220124 | 8/1994 | Japan . |
| 6-279538 | 10/1994 | Japan . |
| 7-26106 | 1/1995 | Japan . |
| 7-207110 | 8/1995 | Japan . |
| 8-3416 | 1/1996 | Japan . |
| 8-59958 | 3/1996 | Japan . |
| 8-143845 | 6/1996 | Japan . |
| 8-209097 | 8/1996 | Japan . |
| 8-259848 | 10/1996 | Japan . |
| 8-259849 | 10/1996 | Japan . |

*Primary Examiner*—Paul R. Michl

[57] ABSTRACT

A resin composition for coating suitable as, for example, a surface coating material capable of improving the coatability, etc., of olefin resin films, etc., which contains an epoxidized block copolymer (A) and an organic compound (B) carrying a functional group reacting with an epoxy group and having a number-average molecular weight of from 150 to 150,000, wherein the weight ratio (A)/(A+B) ranges from 1/100 to 99/100. Another resin composition for coating which contains an epoxidized block copolymer (A), an organic compound (B) carrying a functional group reacting with an epoxy group and having a number-average molecular weight of from 150 to 150,000, and an epoxy ring opening promoter (C), wherein the weight ratio (A)/(A+B) ranges from 1/100 to 99/100 and the content of the above component (C) ranges from 0.1 to 10 parts by weight per 100 parts by weight of (A+B).

14 Claims, No Drawings

RESIN COMPOSITIONS FOR COATING

TECHNICAL FIELD

The present invention relates to a resin composition for coating, more particularly to a resin composition for coating which is suitable as a surface coating material capable of improving the coatability or printability of the surfaces of films, sheets, or molded products containing as base materials a variety of plastics, inter alia, olefin resins or low-polarity polymers, or suitable as a binder for inks or coatings applied to surfaces.

BACKGROUND ART

Olefin resins such as polypropylene, polyethylene, ethylene-propylene copolymers, and ethylene-propylene-conjugated diene copolymers and low-polarity polymers such as styrene-butadiene copolymers and hydrogenated products thereof are extensively used for a variety of end uses such as electrical parts and automobile parts, in that they are inexpensive and have excellent properties such as chemical resistance and moldability.

However, when these low-polarity polyolefins are incorporated into coatings or inks so as to carry out coating or printing in order to protect a surface, to face, to record, etc., the resultant coatings or inks exhibit poor adhesion properties. In order to solve this problem, there are proposed use of a primer primarily containing modified polyolefins such as maleic anhydride-grafted hydrogenated styrene-butadiene block copolymers or maleic anhydride-grafted chlorinated polypropylene, and coatings containing a binder in which these modified polyolefins are incorporated. However, these grafted modified resins do not always provide satisfactory performance of resulting coating films in terms of low-temperature impact resistance or pigment dispersibility, and moreover, they do not always provide sufficient adhesion to polar resins. These drawbacks hamper application of the grafted modified resins to the field of adhesives, etc.

In view of the foregoing, there is strong demand for development of resin compositions for coating which exhibit stable and excellent adhesion to plastics, particularly to olefin resins, and which provide various advantages: affording coating films exhibiting excellent low-temperature impact resistance when used as a primer; permitting excellent pigment dispersion; exhibiting excellent adhesion to a variety of plastics; and being widely applicable to more extensive uses such as coatings, inks, and binders for adhesives. In the present invention, the word "for coating" connotes a broad concept and covers not only the above-described coatings but also inks and adhesives.

DISCLOSURE OF THE INVENTION

The present inventors have found that the above-described problems are solved by a resin composition for coating containing a specific epoxidized block copolymer and an organic compound carrying a functional group reacting with an epoxy group and having a number-average molecular weight of from 150 to 150,000, and an optional epoxy ring opening promoter. The present invention was accomplished based on this finding.

Accordingly, the present invention provides a resin composition for coating containing a specific epoxidized block copolymer (A) and an organic compound (B) carrying a functional group reacting with an epoxy group and having a number-average molecular weight of from 150 to 150,000, wherein the weight ratio (A)/(A+B) ranges from 1/100 to 99/100. The present invention also provides a resin composition for coating containing a specific epoxidized block copolymer (A), an organic compound (B) carrying a functional group reacting with an epoxy group and having a number-average molecular weight of from 150 to 150,000, and an epoxy ring opening promoter (C), wherein the weight ratio (A)/(A+B) ranges from 1/100 to 99/100 and the content of the above component (C) ranges from 0.1 to 10 parts by weight per 100 parts by weight of (A+B). The present invention specifically provides a resin composition for coating as described above wherein the functional group of the organic compound which serves as the component (B) is a hydroxyl group. The present invention specifically provides a resin composition for coating as described above wherein the functional group of the organic compound which serves as the component (B) is a carboxyl group or an acid anhydride group. The present invention specifically provides a resin composition for coating as described above wherein the functional group of the organic compound which serves as the component (B) is an amino group. The present invention specifically provides a resin composition for coating as described above wherein the epoxidized block copolymer serving as the component (A) is an epoxidized product of a block copolymer comprising a block formed of an aromatic vinyl compound and a block formed of a conjugated diene compound, wherein at least one double bond derived from the conjugated diene compound has been epoxidized. The present invention specifically provides a resin composition for coating as described above wherein the conjugated diene compound, i.e., a constituent of the epoxidized block copolymer serving as the component (A), is butadiene/isoprene. The present invention specifically provides a resin composition for coating as described above wherein the block formed of a conjugated diene compound which is a constituent of the epoxidized block copolymer serving as the component (A) is partially hydrogenated. Furthermore, the present invention specifically provides a resin composition for coating as described above containing a solvent which can dissolve or disperse the component (A) and the component (B). Also, the present invention provides a resin composition for coating as described above containing a solvent which can dissolve or disperse the component (A), the component (B), and the component (C). The present invention will next be described in detail. Rest Mode for Carrying out the Invention Component (A)

The epoxidized block copolymers used as the component (A) of the present invention are block copolymers or partially hydrogenated block copolymers wherein at least one double bond derived from the conjugated diene compound of the block copolymers is epoxidized, and the base block copolymers are, for example, block copolymers comprising at least one polymer block A primarily containing a vinyl aromatic compound and at least one polymer block B primarily containing a conjugated compound, e.g., vinyl aromatic compound-conjugated diene compound block copolymers having a structure of A—B, A—B—A, B—A—B—A, (A—B—)$_4$—Si, A—B—A—B—A, and the like. In the present invention, the partially hydrogenated block copolymer refers to a copolymer obtained by hydrogenating the corresponding block copolymer. The above-described examples of block copolymers and partially hydrogenated copolymers will next be described in detail.

The above-described base block copolymers contain at least 5 wt. % and less than 95 wt. %, preferably 10 to 60 wt. %, more preferably 10 to 50 wt.%, of a vinyl aromatic compound.

The vinyl aromatic compound-based polymer block A has a structure of a homopolymer block of the vinyl aromatic compound or a copolymer block comprising a vinyl aromatic compound in the weight ratio of more than 50 wt. %, preferably 70 wt. % or more and a conjugated diene compound; and the conjugated compound-based polymer block B has a structure of a homopolymer block of the conjugate diene compound or a copolymer block comprising a conjugated compound in the weight ratio of more than 50 wt. %, preferably 70 wt. % or more and a vinyl aromatic compound. In the vinyl aromatic compound-based polymer block A and conjugated diene-based polymer block B, the distribution of the conjugated diene or vinyl aromatic compound in a molecular chain in each polymer block may be random, tapered (a monomer component increasing or decreasing along a molecular chain), partial block, or an arbitrary combination thereof. When the block copolymers have two or more of the vinyl aromatic polymer block and the conjugated diene polymer block respectively, the structures of the polymer blocks may be identical to or different from each other.

The vinyl aromatic compounds forming the block copolymers may be one or more species selected from among, for example, styrene, α-methylstyrene, vinyltoluene, p-tert-butylstyrene, and 1,1-diphenylethylene, with styrene being preferred. The conjugated diene compounds may be one or more species selected from among, for example, butadiene, isoprene, 1,3-pentadiene, and 2,3-dimethyl-1,3-butadiene, with butadiene, isoprene, and combinations thereof being preferred. The microstructure in a block among the conjugated diene compound-based polymer blocks may be arbitrarily selected, e.g., a polybutadiene block contains a 1,2-vinyl bond in an amount of preferably 5 to 65%, particularly preferably 10 to 50%.

The block copolymers having the above-described structure typically have a number-average molecular weight of 5,000 to 500,000 and a molecular weight distribution (Mw/Mn)(ratio of weight-average molecular weight (Mw) to number-average molecular weight (Mn)) of 10 or less. Furthermore, the molecular structure of the block copolymers may be linear, branched, radial, or arbitrary combinations thereof. When the molecular weight is less than 5,000, adhesion strength is low due to poor cohesive force and solvent resistance of the formed films decrease, whereas when it is in excess of 500,000, the workability at use of the resin composition for coating disadvantageously decreases.

No particular limitation is imposed on the manufacture method for these block copolymers so long as copolymers having the above-described structure are obtained. For example, a vinyl aromatic compound-conjugated diene compound block copolymer may be synthesized through a method described in Japanese Patent Publication (kokoku) No. 40-23798, by use of a lithium catalyst in an inert solvent.

The partially hydrogenated block copolymers are obtained by hydrogenating the above-described corresponding vinyl aromatic compound-conjugated diene compound block copolymers, and applicable methods therefor are described in Japanese Patent Publication (kokoku) Nos. 42-8704 and 43- 6636. Particularly, hydrogenated block copolymers synthesized by use of a titanium hydrogenation catalyst are most preferred in that they are endowed with excellent weather resistance and heat-deterioration resistance. For example, the hydrogenated block copolymers may be synthesized by hydrogenating block copolymers having the above-described structure through methods described in Japanese Patent Application Laid-Open (kokai) Nos. 59-133208 and 60-79005, by use of a titanium hydrogenation catalyst in an inert solvent. In this case, aliphatic double bonds derived from the conjugated diene compound in a vinyl aromatic compound-conjugated diene compound block copolymer are hydrogenated within a ratio of 10 to 80%, preferably 30 to 80%. These block copolymers and partially hydrogenated block copolymers are commercially available and may be easily obtained.

Next, the epoxidized block copolymers used as component (A) of the present invention are copolymers obtained by reacting an epoxidizing agent with block copolymer or partially hydrogenated block copolymers having the above-described structure to epoxidize a double bond derived from the conjugated diene compound.

The epoxidized block copolymers of component (A) used in the present invention may be obtained by reacting an epoxidizing agent such as hydroperoxides and peracids with the above-described block copolymer or partially hydrogenated block copolymers in an inert solvent. Examples of the peracids include performic acid, peracetic acid, and perbenzoic acid. A catalyst effect may be obtained by use of these peracids singly or in arbitrary mixtures thereof with hydrogen peroxide; an organic acid with hydrogen peroxide; or molybdenum hexacarbonyl with tert-butyl hydroperoxide. The optimum amount of the epoxidizing agents may be determined based on variable factors such as species of epoxidizing agents used, desired epoxidation degree, or species of block copolymers used. The obtained epoxidized block copolymers may be isolated through an appropriate method, for example, by precipitating in a poor solvent; casting the epoxidized block copolymer into hot water under stirring and removing a solvent by evaporation; or directly removing a solvent.

Component (B)

The component (B) is an organic compound carrying at least one kind of a functional group reacting with an epoxy group and having a number-average molecular weight of 150 to 150,000. Examples of the functional group include a hydroxyl group, an amino group, a carboxyl group, an acid anhydride group, and an isocyanate group.

Examples of the compound carrying a hydroxyl group include polyolefin-polyols, polyester-polyols, polyether-polyols, polylactone-polyols, and polyurethane-polyols.

Examples of the polyolefin-polyols include a hydrogenated product of hydroxyl-terminated (both ends) polybutadiene and a hydrogenated product of hydroxyl-terminated (both ends) polyisoprene. Of these, Polytale (product of Mitsubishi Chemical, Co., Ltd., hydroxyl-terminated (both ends) polyolefin-polyol) having a molecular weight of 1,000 to 5,000 is preferred.

Examples of the polyester-polyols include a polyester-polyol obtained through condensation of a polyhydric alcohol and a polyfunctional carboxylic acid. Examples of the polyhydric alcohols include ethylene glycol, propylene glycol, butylene glycol, hexamethylene glycol, glycerin, trimethylolpropane, and pentaerythritol, and examples of the polyfunctional carboxylic acids include succinic acid, adipic acid, sebacic acid, phthalic anhydride, isophthalic acid, cyclohexanedicarboxylic acid, tetrahydrophthalic anhydride, and dimeric acid.

Examples of the polyether-polyols include a polyether-polyol obtained through reaction of the above-described polyhydric alcohols and ethylene oxide, propylene oxide, butylene oxide, tetrahydrofuran, etc. Examples of the polylactone-polyols include a polylactone-polyol obtained through reaction of the above-described polyhydric alcohols and lactones such as caprolactone or butyrolactone.

Examples of the polyurethane-polyols include a polyurethane-polyol obtained through reaction of the above-described polyhydric alcohols and toluene diisocyanate, diphenylmethane diisocyanate, hexamethylene diisocyanate, isophorone diisocyanate, etc. There may also be used carboxyl-terminated polyols obtained by modifying one end or both ends of the above-described polyester-polyols with an acid anhydride.

Preferable examples of the compounds carrying an amino group include a polyamide-polyamine obtained through condensation of the polyfunctional carboxylic acids and polyamines such as ethylenediamine, diethylenetriamine, triethylenetetramine, tetraethylenepentamine, propanediamine, hexamethylenediamine, isophoronediamine, phenylenediamine, or diaminodiphenylmethane.

Preferable examples of the compounds carrying an epoxy group include an alicyclic epoxy compound, 1,6-hexanediol diglycidyl ether, bisphenol A diglycidyl ether, polypropylene glycol diglycidyl ether, hexahydrophthalic acid diglycidyl ether, a $C_{14}$–$C_{15}$ mixed alcohol glycidyl ether, and trimethylolproapne polyglycidyl ether. Examples of the compounds carrying an isocyanate group include a product obtained by reacting the above-described polyhydric alcohols and an excess amount of the above-described polyisocyanates.

When the molecular weight of the component (B) is 150 or less, coating films obtained from the resin compositions for coating have poor water resistance and moisture resistance, whereas when the molecular weight of the component (B) is in excess of 150,000, the compatibility to an epoxidized block copolymer (A) decreases to result in decrease of storage stability of the obtained resin compositions for coating.

Component (C)

Examples of the epoxy ring opening promoters (C) include the following compounds (1) to (6).

(1) Tertiary amines, e.g., benzyldimethylamine, tributylamine, tris(dimethylamino)methyl phenol, p-(dimethylamino)pyridine, and triphenylamine.

(2) Quaternary ammonium compounds, e.g., tetra-n-butylammonium fluoride, tetraethylammonium fluoride, an alkyl ($C_{8-18}$) dimethylbenzylammonium chloride, benzylacetyldimethylethylammonium chloride, an benzyldimethylalkyl ($C_{8-18}$) ammonium chloride, benzyldimethylstearylammonium chloride, benzyl-tri-n-butylammonium chloride, (3-chloro-2-hydroxy-n-propyl) trimethylammonium chloride, n-decyltrimethylammonium chloride, diallyldimethylammonium chloride, dimethylbenzylphenylammonium chloride, distearyldimethylammonium chloride, dodecyltrimethylammonium chloride, n-hexadecyltrimethylammonium chloride, (2-methoxyethoxymethyl)triethylammonium chloride, n-octyltrimethylammonium chloride, phenyltriethylammonium chloride, stearyltrimethylammonium chloride, tetradecyldimethylbenzylammonium chloride, tetra-n-amylammonium chloride, tetra-n-butylammonium chloride, n-tetradecyltrimethylammonium chloride, tetraethylammonium chloride, tetramethylammonium chloride, triethylbenzylammonium chloride, trimethylbenzylammonium chloride, trioctylmethylammonium chloride, benzyltri-n-butylammonium bromide, cetyldimethylammonium bromide, n-decyltrimethylammonium bromide, dilauryldimethylammonium bromide, distearyldimethylammonium bromide, n-hexadecyltrimethylammonium bromide, n-hexyltrimethylammonium bromide, n-octyltrimethylammonium bromide, phenyltrimethylammonium bromide, stearyltrimethylammonium bromide, tetra-n-butylammonium bromide, tetra-n-decylammonium bromide, n-tetradecyltrimethylammonium bromide, tetra-ethylammonium bromide, tetramethylammonium bromide, tetra-n-propylammonium bromide, tetraethylbenzylammonium bromide, ethyltrimethylammonium iodide, ethyltri-n-propylammonium iodide, phenyltriethylammonium iodide, phenyltrimethylammonium iodide, tetra-n-amylammonium iodide, tetra-n-butylammonium iodide, tetraethylammonium iodide, tetra-n-octylammonium iodide, tetra-n-propylammonium iodide, and triethylbenzylammonium iodide.

(3) Phosphonium compounds, e.g., allyltriphenylphosphonium bromide, allyltriphenylphosphonium chloride, n-amyltriphenylphosphonium bromide, benzyltriphenylphosphonium chloride, bromomethyltriphenylphosphonium bromide, 3-bromopropyltriphenylphosphonium bromide, n-butyltriphenylphosphonium bromide, 4-carboxybutyltriphenylphosphonium bromide, chloromethyltriphenylphosphonium bromide, cinnamyltriphenylphosphonium bromide, 2-dimethylaminoethyltriphenylphosphonium bromide, 2-(1,3-dioxan-2-yl)ethyltriphenylphosphonium bromide, 2-(1,3-dioxoran-2-yl)ethyltriphenylphosphonium bromide, 4-ethoxybenzyltriphenylphosphonium bromide, ethoxycarboxymethyl(triphenylphosphonium) bromide, ethyltriphenylphosphonium bromide, (formylethyl) triphenylphosphonium bromide, n-heptyltriphenylphosphonium bromide, n-hexyltriphenylphosphonium bromide, (methoxymethyl) triphenylphosphonium chloride, methyltriphenylphosphonium iodide, methyltriphenylphosphonium bromide, t-oxobis[tris(dimethylamino)phosphonium]bis[tetrafluoroborate], phenacyltriphenylphosphonium bromide, tetra-n-butylphosphonium bromide, tetraethylphosphonium bromide, tetrakis(hydroxymethyl) phosphonium sulfate, tetrakis(hydroxymethyl)phosphonium chloride, tetraphenylphosphonium bromide, tetraphenylphosphonium chloride, tetraphenylphosphonium iodide, tetraphenylphosphonium tetraphenylborate, and 2-(trimethylsilyl)ethoxymethyltriphenylphosphonium chloride.

(4) Pyridinium compounds, e.g., 1-acetonylpyridinium chloride, 1-(aminoformylmethyl)pyridinium chloride, 1-pyridinium iodide, 2-bromo-1-ethylpyridinium tetrafluoroborate, 4-bromopyridine hydroborate, 4-bromopyridine hydrochloride, N-n-butylpyridinium chloride, 3-carbamyl-1-methylpyridinium chloride, 2-(chloromethyl)pyridine hydrochloride, 3-(chloromethyl) pyridine hydrochloride, 4 -(chloromethyl)pyridine hydrochloride, 2-chloro-1-methylpyridinium iodide, 2-chloro-l-methylpyridinium p-toluenesulfonate, 4-chloropyridine hydrochloride, cetylpyridinium chloride monohydrate, 1-(cyanomethyl)pyridinium chloride, N,N'-dibenzyl-4,4'-bipyridinium dichloride, 1,1'-di-n-heptyl-4,4$^1$-bipyridinium dibromide, 2,6-dihydroxypyridine hydrochloride, 4-dimethylamino-1-neopentylpyridinium chloride, 4-dimethlaminopyridinium bromide perbromide, 1,1'-dimethyl-4,4'-dipyridinium chloride, 2,6-dimethylpyridinium p-toluenesulfonate, N',N-dioctyl-4,4'-bipyridinium dibromide, 2,6-diphenyl-4-pyridinio) phenolate, dodecylpyridinium chloride, 1-(ethoxycarbonylmethyl[]pyridinium chloride, 1-ethyl-4-methoxycarbonylpyridinium iodide, 1-ethylpyridinium bromide, 2-fluoro-1-methylpyridinium p-toluenesulfonate, hexadecylpyridinium bromide, hexadecylpyridinium chloride, isonicotinoyl chloride hydrochloride, 1-methyl-4-[4-(4-aminonaphthylazo)phenylazo]pyridinium iodide, 1-methyl-4-(4-diethylaminophenylazo)pyridinium iodide, N-methylpyridinium-2-aldoxime chloride, 1-(4- nitrobenzyl)-4-(4-diethylaminophenylazo)pyridinium bromide, 1-octadecyl-4-(phenyl-1,3-butadienyl)pyridinium bromide, N-(10,12-pentacosadinyl)pyridinium bromide, 1-phenacylpyridinium bromide, N-phenylnicotinamide hydrochloride, picolinic acid hydrochloride, picolinoyl chloride hydrochloride, pyridine polyfluoride hydrofluoride, pyridinium chlorochromate, pyridinium dichromate, pyridinium fluorochromate, pyridinium hydrobromide perbromide, pyridinium m-nitrobenzenesulfonate, pyridinium p-toluenesulfonate, pyridoxamine dihydrochloride, pyridoxy hydrochloride, 2-pyridylacetic acid hydrochloride, 3-pyridylacetic acid hydrochloride, 1-(4-pyridyl)-pyridinium chloride hydrochloride, tetrakis(1-methylpyridinium-4-yl)porphine p-toluenesulfonate, and 2,4,6-trimethylpyridinium p-toluenesulfonate.

(5) Imidazoles, e.g., imidazole, 2-methylimidazole, 2-phenylimidazole, 2-undecylimidazole, 2-heptadecylimidazole, 1-benzyl-2-methylimidazole, 2-phenyl-4-methylimidazole, 1-cyanoethyl-2-methylimidazole, 1-cyanoethyl-2-phenylimidazole, 1-cyanoethyl-2-ethyl-4-methylimidazole, 1-aminoethyl-2-methylimidazole, 1-(cyanoethylaminoethyl)-2-methylimidazole, N-(2-methylimidazolyl-1-ethyl)urea, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4(5)-ethylimidazole, 1-cyanoethyl-2-ethyl-4-methylimidazole trimellitate, 1-cyanoethyl-2-undecylimidazole trimellitate, 2,4-diamino-6-[2'-methylimidazolyl-(1')]ethyl-S-triazine, 2,4-diamino-6-[2'-undecylimidazolyl-(1')]ethyl-S-triazine, 2,4-diamino-6-[2'-ethyl-4-methylimidazolyl-(1')]ethyl-S-triazine, 1-dodecyl-2-methyl-3-benzylimidazolium chloride, N,N'-bis(2-methylimidazolyl-1-ethyl)urea, N,N'-[2-methylimidazolyl-(1)-ethyl]adipoyldiamide, 2,4-dialkylimidazole-5-dithiocarboxylic acid, 1,3-benzyl-2-methylimidazolium chloride, 2-phenyl-4,5-dihydroxymethylimidazole, 1-cyanoethyl-2-phenyl-4,5-di(cyanoethoxymethyl)imidazole, 1-isobutyl-2-methylimidazole, 2-ethyl-4(5)-methylimidazole, and 2-methylimidazolazine.

(6) Phosphines, e.g., triphenylphosphine, tricyclophosphine, tributylphosphine, allyldiphenylphosphine, tribenzylphosphine, and tri-tolylphosphine.

Among the above compounds described in (1) to (6), the following compounds are preferred: phosphonium compounds such as n-amyltriphenylphosphonium bromide, benzyltriphenylphosphonium chloride, bromomethyltriphenylphosphonium bromide, n-butyltriphenylphosphonium bromide, ethyltriphenylphosphonium bromide, n-heptyltriphenylphosphonium bromide, n-hexyltriphenylphosphonium bromide, hethyltriphenylphosphonium iodide, methyltriphenylphosphonium bromide, tetra-n-butylphosphonium bromide, tetraethylphosphonium bromide, tetraphenylphosphonium chloride, tetraphenylphosphonium bromide, tetraphenylphosphonium iodide, or tetraphenylphosphonium tetraphenylborate; pyridinium compounds such as 1-acetonylpyridinium chloride, 1-(aminoformylmethyl)pyridinium chloride, N-n-butylpyridinium chloride, 3-carbamyl-1-methylpyridinium chloride, 1-cyanomethyl-1-metylpyridinium chloride, N,N'-dibenzyl-4,4'-bipyridinium dichloride, 1,1'-di-n-heptyl-4,4'-bipyridinium dibromide, 4-dimethylamino-1-neopentylpyridinium chloride, 1,1'-dimethyl-4,4'-dipyridinium dichloride, N,N'-dioctyl- 4,4'-bipyridium dibromide, 1-(ethoxycarbonylmethyl)pyridinium chloride, 1-ethyl-4-methoxycarbonylpyridinium iodide, 1-ethylpyridinium bromide, 2-fluoro-1-methylpyridinium p-toluenesulfonate, 1-octadecyl-4-(4-phenyl-1,3-butadienyl)pyridinium bromide, or 1-phenacylpyridinium bromide; imidazoles such as 2-ethyl-4(5)-methylimidazole or 1-cyanoethyl-2-ethyl-4(5)-ethylimidazole; and phosphines such as triphenylphosphine or tributylphosphine.

More preferable examples include tetra-n-butylphosphonium bromide, tetraphenylphosphonium bromide, tetraphenylphosphonium tetraphenylborate, N-n-butylpyridinium chloride, 1-(cyanomethyl)pyridinium chloride, N,N'-dibenzyl-4,41-bipyridinium dichloride, 4-dimethylamino-1-neopentylpyridinium chloride, 1-ethylpyridinium bromide, 1-ethylpyridinium bromide, and 1-phenacylpyridinium bromide.

Ratio of components (A), (Bo. and (C)

The component (A) in the resin composition for coating of the present invention containing components (A) and (B) must be contained at the weight ratio A/(A+B) ranging from 1/100 to 99/100, preferably 10/100 to 90/100. When the content of the component (A) is less than the required range, the adhesion of the films obtained from the compositions to substrates such as plastics and metals is poor, whereas the content is more than the range, dispersibility of pigments to the composition and dispersion stability of the composition are poor. When the composition contains the component (C), the weight ratio (A)/(A+B) ranges from 1/100 to 99/100 and the content of the component (C) ranges from 0.1 to 10 parts by weight, preferably 0.2 to 5 parts by weight per 100 parts by weight of (A+B). When the content is in excess of 10 parts by weight, the storage stability of the compositions for coating decreases.

The resin compositions for coating of the present invention may contain additives such as pigments, dyes, fillers, antioxidants, photo-stabilizers, UV-absorbers, thixotropic agents, thickening agents, leveling agents, surfactants, emulsifiers, preservatives, anti-blocking agents, slipping agents, anti-static agents, and tackifiers; crosslinking agents such as polyisocyanate compounds, block isocyanates, polyepoxides, alkyl ether-modified melamine-formalin resins, and silane coupling agents; resins for coating such as chlorinated polypropylene, acrylic resins, unsaturated polyester resins, polyurethane resins, alkyd resins, cellulose resins, vinyl chloride/vinyl acetate copolymers, poly(vinyl acetate), and polyamide resins; and optional styrenic thermoplastic elastomers as unmodified block copolymers.

Method for manufacturing the resin composition for coating

The resin compositions for coating may be manufactured by reacting the component (A) and the component (B) in advance. Alternatively, the optional component (C) is added and the mixture is melt-kneaded at 130 to 250° by use of an extruder to induce reaction, or these raw materials are dissolved in an organic solvent and the mixture is allowed to react at 0 to 2000 for 0.1 to 20 hours.

The resins compositions for coating of the present invention are typically used as compositions containing the component (A), the component (B), and a solvent which dissolves or disperses the components (A),(B) and the optional component (C).

Specifically, the compositions may be used as a solution thereof containing a solvent, for example, aromatic hydrocarbons such as toluene, xylene, or chlorobenzene; alicyclics such as cyclohexane; tetralin; mineral spirit; heptane; and tetrahydrofuran singly or in combination with polar solvents such as methyl ethyl ketone, methyl isobutyl ketone, ethyl acetate, butyl acetate, ethylene glycol dimethyl ether, methylcellosolve acetate, cellosolve, ethanol, or propanol. The compositions may also be used as a dispersion thereof containing a dispersion medium such as methyl ethyl ketone, methyl isobutyl ketone, ethyl acetate, butyl acetate, ethylene glycol dimethyl ether, methylcellosolve acetate, cellosolve, ethanol, propanol, or water.

No particular limitation is imposed on the amount of the solvents used, and typically solid content is preferably 1 to 70 wt. %, more preferably 4 to 60 wt. %, in view of ease of handling and workability. When the amount is less than 1 wt. %, obtaining a required coating film is difficult through one application process, whereas when it is in excess of 70 wt. %, the extremely high viscosity results in poor workability.

Method for applying the resin compositions for coating

The coating amount varies depending on required performance and objects to which the compositions are applied. Typically, the compositions are applied by use of a spray, a brush, a coater, a printer, etc. so that the dried film may have a thickness of 0.1 to 100 μm.

EXAMPLES

The present invention will next be described more specifically by way of examples, which should not be construed as limiting the invention thereto. Hereinafter, the term "part" will refer to "part by weight" unless otherwise specified.

(Preparation of epoxidized block copolymers)

(A-1): Partially hydrogenated SBS, obtained through hydrogenerating 30% of a block derived from butadiene in a styrene-butadiene block copolymer (SBS) having a styrene/butadiene weight ratio of 30/70, was epoxidized with peracetic acid, to thereby obtain a compound (A-1). This compound had an epoxy equivalent of 390, a number-average molecular weight of 49,500, and a weight-average molecular weight of 52,300.

(A-2): Partially hydrogenated SIS, obtained through hydrogenerating 75% of a block derived from isoprene in a styrene-isoprene-styrene block copolymer (SIS) having a styrene/isoprene weight ratio of 30/70, was epoxidized with peracetic acid, to thereby obtain a compound (A-2). This compound had an epoxy equivalent of 465, a number-average molecular weight of 61,000, and a weight-average molecular weight of 72,300.

(A-3): Partially hydrogenated SBS, obtained through hydrogenerating 79% of a block derived from butadiene in a styrene-butadiene-styrene block copolymer having a styrene/butadiene weight ratio of 30/70, was epoxidized with peracetic acid, to thereby obtain a compound (A-3). This compound had an epoxy equivalent of 525, a number-average molecular weight of 73,000, and a weight-average molecular weight of 88,500.

(A-4): A styrene-butadiene-styrene block copolymer having a styrene/butadiene weight ratio of 40/60 was epoxidized with peracetic acid, to thereby obtain a compound (A-4). This compound had an epoxy equivalent of 520, a number-average molecular weight of 82,000, and a weight-average molecular weight of 99,500.

(Preparation of organic compounds having a functional group which reacts with an epoxy group)

(b-1): 200 parts of 1,6-hexanediol, 32 parts of polytetramethylene glycol having an average molecular weight of 650, and 222 parts of isophorone diisocyanate were allowed to react, to thereby obtain polyurethane-diol (b-1).

(b-2): 104 parts of neopentyl glycol, 228 parts of 1,6-hexanediol, 234 parts of adipic acid, 31 parts of hexahydrophthalic anhydride were subjected to dehydration, to thereby obtain polyester-diol (b-2).

(b-3): 132 parts of polyolefin-polyol having a molecule weight of 2,000 (Polytale HA; product of Mitsubishi Chemical, Co., Ltd.) and 12.3 parts of isophorone diisocyanate were allowed to react, to thereby obtain modified polyolefin-polyol (b-3).

Example 1

To a solution of an epoxidized block copolymer (A-1, 100 parts) in xylene (solid content: 28.6 wt. %), there were added a solution (57.0 parts) of polyurethane-diol (b-1) in methyl ethyl ketone (solid content: 35 wt. %) and triphenyl phosphine (3 parts). The mixture was diluted with ethanol (10 parts), methyl ethyl ketone (20 parts), and toluene (178 parts), to thereby obtain a 20% solution of a resin composition for coating (I-1) having a weight ratio A/(A+B) of 83/100.

Example 2

A solution of an epoxidized block copolymer (A-2, 100 parts) in xylene was mixed with a solution (1,500 parts) of polyester-diol (b-2) in methyl ethyl ketone (solid content: 60%), toluene(1,500 parts) and triphenyl phosphine (5 parts). The mixture was allowed to react at 120° C. for 5 hours, and then the resultant mixture was diluted with methyl isobutyl ketone (171 parts), isopropyl alcohol (43 parts), and toluene, to thereby obtain a 30% solution of a resin composition for coating (I-2) having a weight ratio A/(A+B) of 10/100.

Example 3

To a solution of an epoxidized block copolymer (A-3, 50 parts) in toluene, there were added a solution (20 parts) of modified polyolefin-polyol (b-3) in toluene (solid content: 40%) and 2-heptadecylimidazole (5 parts). The mixture was allowed to react at 120° C. for 5 hours, and was then diluted with butyl acetate (36 parts), ethanol (9 parts), and toluene, to thereby obtain a 20% solution of a resin composition for coating (I-3) having a weight ratio A/(A+B) of 86/100.

Example 4

To a solution of an epoxidized block copolymer (A-4, 100 parts) in toluene, there was added a methyl ethyl ketone solution (70 parts) of polyester-diol (b-2) which was carboxy-terminated with succinic anhydride (solid content: 60%). The mixture was allowed to react at 120° C. for 5 hours, and was then diluted with ethanol (18 parts), methyl ethyl ketone (37 parts) and toluene, to thereby obtain a 25% solution of a resin composition for coating (I-4) having a weight ratio of 70/100.

Example 5

To a solution of an epoxidized block copolymer (A-1, 100 parts), there was added isophoronediamine (5 parts).

The mixture was allowed to react at 50° C. for 2 hours, and then the resultant mixture was diluted with ethanol (22 parts), methyl ethyl ketone (45 parts) and toluene, to thereby obtain a 20% solution of a resin composition for coating (I-5) having a weight ratio A/(A+B) of 95/100.

Example 6

Sodium dioctylsulfosuccinate (3 parts, serving as a surfactant) was added to and dissolved in a 20% solution (500 parts) of a resin composition for coating (I-1) obtained in Example 1, and the mixture was stirred and emulsified by use of a homogenizing mixer while an equivolume of water was added under stirring. A small amount of defoaming agent ("013B," product of Dow Corning) was added to the resultant emulsion, and the organic solvent was removed by evaporation under reduced pressure by use of a rotary evaporator, to thereby obtain an aqueous dispersion of a resin composition for coating (I-6) (solid content: 45%).

Comparative Example 1

Methyl ethyl ketone was added to a solution of a hydrogenated styrene-butadiene-styrene block copolymer (Kraton G-1652, product of Shell Chemical, 100 parts) in xylene (solid content: 28.6%), to thereby obtain a solution of a resin composition (II-1) (solid content: 20%) for comparison.

Comparative Example 2

An acid-modified hydrogenated styrene-butadiene-styrene block copolymer (Kraton G-1901X, product of Shell Chemical, 100 parts) was dissolved in toluene (400 parts) with heat so as to form a solution, and sodium dioctylsulfosuccinate (3 parts) was mixed and dissolved in the solution at room temperature. The solution was emulsified by use of a homogenizing mixer under high-speed stirring while distilled water (500 parts) was added thereto.

The emulsion was transferred into a rotary evaporator. After one drop of a defoaming agent was added to the emulsion, the organic solvent was removed under reduced pressure to thereby obtain an aqueous dispersion (II-2) having a solid content of 45%.

Comparative Example 3

Ethanol (10 parts) was added to the same solution (450 parts) of an epoxidized block copolymer (A-1) as used in Example 1 and the mixture was allowed to react at about 80° C. for 8 hours. The resultant mixture was diluted with methyl ethyl ketone (42 parts) and toluene, to thereby obtain a solution of a resin composition (II-3) (solid content of 20%) for comparison.

Comparative Example 4

The same solution of an epoxidized block copolymer (A-1) as used in Example 1 (4.6 parts) was mixed with the solution of modified polyolefin-polyol (b-3) in toluene used in Example 3 (630 parts) (solid content 40%) and triphenylphosphine (1 part). The mixture was allowed to react at 120° C. for 5 hours, to thereby obtain a solution of a resin composition (II-4) for comparison having a weight ratio A/(A +B) of 0.5/100 (solid content: 40%).

Comparative Example 5

The same polyester-diol solution (b-2) as used in Example 2 (0.5 parts) and triphenylphosphine (1 part) were added to the solution of an epoxidized block copolymer (A-1) used in Example 1 (450 parts). The mixture was allowed to react at about 120° C. for 5 hours and the reaction mixture was diluted with ethanol (8 parts), methyl ethyl ketone (32 parts), and toluene, to thereby obtain a solution of a resin composition (II-5) for comparison having a weight ratio A/(A+B) of 99.8/100 (solid content: 20%).

Evaluation of primers for coating

To each of the solutions of compositions obtained from Examples and Comparative Examples, there were added titanium oxide (30 part) and carbon black (1 part) per 100 parts of the solid content. As shown in Tables 1 and 2, crosslinking agents were further added in some cases. The mixtures were kneaded by use of a sand-mill to thereby prepare primers for plastic coating. Each of the primers was placed in a sealed vessel and allowed to stand at 40° C. for 1 month. Pigment dispersibility in the primer stock was evaluated by observing changes caused therein.

Regarding the solvent system, a diluted solvent of xylene/toluene with a mixing ratio of 1:1 was used as an organic solvent system, and as for the water dispersions, the viscosity of the dispersion was adjusted to about 15 to 20 seconds with water by use of Ford cup #4.

The primers were sprayed onto substrates for coating shown in Tables 1 and 2 by use of an air-gun so as to achieve a dry coating thickness of about 10 p and baked at 80° C. for 30 minutes for the case of aqueous primers or dried at room temperature for the case of organic solvents. Then, a commercially available two-component urethane coating was applied onto the primer coating films so that the dry coating thickness of the urethane coating was about 40 $\mu$, and baked at 80° C. for one hour to thereby obtain test pieces. Pigment dispersibility and initial adhesion were evaluated, and thereafter, low-temperature impact resistance, gasoline resistance, hot water resistance, and heat-cycle resistance were further evaluated after the coated test pieces were allowed to stand in a 23° C. thermostatic chamber for one week.

Pigment dispersibility: O, no change—slightly thickened; X, pigment precipitation or remarkable increase in thickness. Evaluation was performed for Example 6 through observing the presence or absence of the phase separation.

Initial adhesion: A lattice pattern test (2 mm×100 lattices) was performed with cellophane tape, and the number of residual lattices that remained after 3 repetitions of peeling of the tape was counted at the same site. O, residual lattices 95 or more; Δ, less than 95 and 80 or more; X, less than 80.

Low-temperature impact resistance: By use of a du Pont impact tester, a load of 1 kg was allowed to fall from the height of 50 cm to a coated test piece having a 2-inch impact center which precooled to −40° C., and the conditions of the coating surface was observed for evaluation. O, almost no damage by the application of impact; Δ, partially cracked slightly; X, obviously cracked.

Gasoline resistance: A lattice pattern peeling test with cellophane tape was performed in a manner identical to that of the initial adhesion test, after test pieces were soaked in gasoline at room temperature for 1 hour.

Hot water resistance: A lattice pattern peeling test with cellophane tape was performed in a manner identical to that of the initial adhesion test, after test pieces were soaked in hot water at 40° C. for 240 hour.

Heat-cycle resistance: A lattice pattern peeling test with cellophane tape was performed in a manner identical to that of the initial adhesion test, after test pieces were subjected to 3 cycles of 50° C./98% RH/16 hours, room temperature/0.5 hours, −30° C./3 hours, room temperature/0.5 hours, 80° C./3 hours, and room temperature/1 hour.

Evaluation of heat-seal type adhesives

An alicyclic petroleum resin (Arukon P125, product of Arakawa Chemical Industry Co., Ltd.), a terpene-phenolic resin (YS Polyster T115, product of Yasuhara Chemical), and N-oleylerucamide were incorporated into the solutions of compositions obtained from Examples and Comparative Examples at the ratios specified in Table 3 and the mixtures were diluted with toluene to thereby prepare heat-seal type adhesives each having a solid content of 30% (1 to 7).

Each of the thus-prepared adhesives was applied onto a backside of a polypropylene label by use of a bar coater so as to achieve a dry coating amount of about 3 g/m$^2$. The label was applied onto a substrate specified in Table 3 with pressure so that the adhesive contacts the surface of the substrate, and then a heat-seal bar at a temperature specified in Table 3 was press-applied thereto with a pressure of 2 kg/cm² for 2 seconds from the label side to complete sealing. The results of the adhesion strength and cold-heat resistance of the label heat-sealed at 110, 120, and 130° C. are shown in Table 3.

Adhesion strength: A T-shape peeling resistance was evaluated by use of a Schopper type tester at a tensile speed of 300 mm/minute. O, peeling resistance 500 g/15 mm or more; Δ, peeling resistance 300–500 g/15 mm; X, peeling resistance 300 g/15 mm or less.

Cold-heat resistance: The peeling resistance of each of the labels was evaluated after a substrate heat-sealed with the label was subjected to 10 heat cycles, each cycle being 80° C./5 hours, room temperature/1 hour, −30° C./5 hours, or room temperature/1 hour.

TABLE 1

Evaluation of primers for coating

| | Example | | | | |
|---|---|---|---|---|---|
| | 1 | 2 | 3 | 4 | 5 |
| Compn. solution | I-1 | I-2 | I-3 | I-4 | I-5 |
| A/(A + B) | 83/100 | 10/100 | 86/100 | 70/100 | 95/100 |
| C/(A + B) | 2.5/100 | 0.5/100 | 8.6/100 | 0/100 | 0/100 |
| Solid (wt. %) | 20 | 30 | 20 | 25 | 20 |
| Solvent system | mixture | mixture | mixture | mixture | mixture |
| Pigment Dispersibility | O | O | O | O | O |
| Coating formula (pts. by weight) | | | | | |
| Compn. solution | 500 | 313 | 500 | 400 | 500 |
| Pigment | 31 | 31 | 31 | 31 | 31 |
| Melamine compound*1 | 5 | | 5 | | |
| Polyisocyante*2 | 5 | 5 | | | |
| Epoxy resin*3 | | 5 | | | |
| Coating substrate*4 | PP | PA | PBT | PBT | PA |
| Evaluation of coating film | | | | | |
| Initial adhesion | O | O | O | O | O |
| Low-temp. impact resistance | O | O | O | O | O |
| Gasoline resistance | O | O | O | O | O |
| Hot water resistance | O | O | O | O | O |
| Heat-cycle resistance | O | O | O | O | O |

*1: Hexamethoxymethylmelamine
*2: Methyl ethyl ketooxime-blocked isocyanurate trimer of hexamethylene diisocyanate
*3: Epoxy resin, bisphenol A diglycidyl ether type
*4: PP/polypropylene, PA/polyamide (Nylon 6), PBT/polybutylene terephthalate

TABLE 2

Evaluation of primers for coating

| | Example | Comparative Example | | | |
|---|---|---|---|---|---|
| | 6 | 1 | 3 | 4 | 5 |
| Compn. solution | I-6 | II-1 | II-3 | II-4 | II-5 |
| A/(A + B) | 83/100 | 100/100 | 93/100 | 0.4/100 | 99.6/10 |
| C/(A + B) | 2.5/100 | 0/100 | 0/100 | 0.4/100 | 0 |
| Solid (wt. %) | 50 | 20 | 20 | 40 | 0.8/100 |
| Solvent system | water | mixture | mixture | mixture | 20 |

TABLE 2-continued

Evaluation of primers for coating

| | Example | Comparative Example | | | |
|---|---|---|---|---|---|
| | 6 | 1 | 3 | 4 | 5 |
| Pigment dispersibility | O | X | O | O | mixture X |
| Coating formula (pts. by weight) | | | | | |
| Compn. solution | 200 | 500 | 500 | 250 | |
| Pigment | | 31 | 31 | 31 | 500 |
| Melamine compound*1 | 5 | 5 | 5 | | 31 |
| Polyisocyanate*2 | | 5 | | 5 | |
| Epoxy resin*3 | | | | 5 | 5 |
| | | | | | 5 |
| Coating substrate*4 | PP | PP | PP | PP | PP |
| Evaluation of coating film | | | | | |
| Initial adhesion | O | Δ | Δ | X | O |
| Low-temp. impact resistance | O | O | O | — | O |
| Gasoline resistance | O | X | X | — | X |
| Hot water resistance | Δ | X | X | — | Δ |
| Heat-cycle resistance | O | X | X | — | Δ |

*1: Hexamethoxymethylmelamine
*2: Methyl ethyl ketooxime-blocked isocyanurate trimer of hexamethylene diisocyanate
*3: Epoxy resin, bisphenol A diglycidyl ether type
*4: PP/polypropylene, PA/polyamide (Nylon 6), PBT/polybutylene terephthalate

TABLE 3

Evaluation of heat-seal adhesives

| | Heat-seal adhesive | | | | | | |
|---|---|---|---|---|---|---|---|
| Composition | 1 | 2 | 3 | 4 | 5 | 6 | 7 |
| Compn. I-1 | 500 | 250 | | | | | 100 |
| Compn. I-2 | | 156 | | | | | |
| Compn. I-3 | | | 500 | 250 | | | |
| Compn. I-4 | | | | 250 | | | |
| Compn. II-1 | | | | | 500 | | |
| Compn. II-4 | | | | | | 250 | |
| Petroleum resin | 20 | 20 | 20 | 20 | 20 | 20 | |
| Hydrocarbon resin | 20 | 20 | 20 | 20 | 20 | 20 | |
| N-OEA*5 | 1 | 1 | 1 | 1 | 1 | 1 | |
| Material to be adhered*1 | PE | PE | Al | PET | PE | PE | Al |
| Adhesion strength | | | | | | | |
| 110° C. | O | O | O | O | Δ | X | O |
| 120° C. | O | O | O | O | O | X | O |
| 130° C. | O | O | O | O | O | X | O |
| Cold-heat resistance | | | | | | | |
| 110° C. | O | O | O | O | X | X | O |
| 120° C. | O | O | O | O | Δ | X | O |
| 130° C. | O | O | O | O | Δ | X | O |

*1: PE/polyethylene, Al/aluminum foil, PET/polyethylene terephthalate
*5: N-OEA: N-oleylerucamide

RESULTS

As shown in the test results of the present invention, the compositions of Examples 1 to 6 had excellent pigment dispersibility and characteristics of coating films, whereas the composition of Comparative Example 1 exhibited inferior results in terms of pigment dispersibility, gasoline resistance, hot water resistance, and heat-cycle resistance. Separation of a resin component as a result of aggregation after 40OC/day and poor storage stability were observed for Comparative Example 2. Evaluation of prepared heat-seal type adhesives demonstrated that the compositions of the present invention have excellent adhesion to polyethylene, aluminum foils, and polyethylene terephthalate.

INDUSTRIAL APPLICABILITY

The present invention provides resin compositions for coating which exhibit excellent adhesion with plastics and which are useful for primers for enhancing adhesion with coatings for a variety of plastics such as polyolefins, adhesives, or inks; adhesion-improving additives for coatings for a variety of plastics, adhesives, and inks; binders to be incorporated into a variety of plastic coatings; adhesives such as heat-seal adhesives for a variety of plastics or for adhesion between plastics and a variety of metals, adhesives for dry laminates, and pressure-sensitive adhesives; and binders for a variety of plastic inks. When the compositions were used as primers, the primers showed excellent pigment dispersibility, cold resistance, crosslinkability, storage stability, etc., and were applicable to a broad range of uses.

What is claimed is:

1. A resin composition for coating comprising the following components (A) and (B):
   (A) an epoxidized block copolymer which is an epoxidized product of a block copolymer comprising a block formed of an aromatic vinyl compound and a block formed of a conjugated diene compound, wherein at least one double bond derived from the conjugated diene compound has been epoxidized,
   (B) an organic compound carrying a functional hydroxyl group reacting with an epoxy group and having a number-average molecular weight of from 150 to 150,000, the ratio (A)/((A)+(B)) by weight ranging from 1/100 to 99/100.

2. The resin composition for coating as described in claim 1, wherein the conjugated diene compound which is a constituent of the epoxidized block copolymer serving as the component (A) is butadiene and/or isoprene.

3. The resin composition for coating as described in claim 1, wherein the block formed of a conjugated diene compound which is a constituent of the epoxidized block copolymer serving as the component (A) is partially hydrogenated.

4. The resin composition for coating as described in claim 2, wherein the block formed of a conjugated diene compound which is a constituent of the epoxidized block copolymer serving as the component (A) is partially hydrogenated.

5. The resin composition for coating as described in claim 1, further comprising a solvent which can dissolve or disperse the component (A) and the component (B).

6. A resin composition for coating comprising the following components (A), (B), and (C):
   (A) an epoxidized block copolymer which is an epoxidized product of a block copolymer comprising a block formed of an aromatic vinyl compound and a block formed of a conjugated diene compound, wherein at least one double bond derived from the conjugated diene compound has been epoxidized,
   (B) an organic compound carrying a functional hydroxyl group reacting with an epoxy group and having a number-average molecular weight of from 150 to 150,000, and
   (C) an epoxy ring opening promoter, the ratio (A)/((A)+(B)) by weight ranging from 1/100 to 99/100 and the content of the component (C) ranging from 0.1 to 10 parts by weight per 100 parts by weight of (A)+(B).

7. The resin composition for coating as described in claim 6, wherein the conjugated diene compound which is a constituent of the epoxidized block copolymer serving as the component (A) is butadiene and/or isoprene.

8. The resin composition for coating as described in claim 6, wherein the block formed of a conjugated diene compound which is a constituent of the epoxidized block copolymer serving as the component (A) is partially hydrogenated.

9. The resin composition for coating as described in claim 7, wherein the block formed of a conjugated diene compound which is a constituent of the epoxidized block copolymer serving as the component (A) is partially hydrogenated.

10. The resin composition for coating as described in claim 6, further comprising a solvent which can dissolve or disperse the component (A), the component (B), and the component (C).

11. The resin composition for coating as described in claim 1, wherein the organic compound which serves as the component (B) is a member selected from the group consisting of polyolefin-polyol, a polyester-polyl, a polyether-polyol, a polylactone-polyol, and a polyurethane-polyol.

12. The resin composition for coating as described in claim 6, wherein the organic compound which serves as the component (B) is a member selected from the group consisting of a polyolefin-polyol, a polyester-polyol, a polyether-polyol, a polylactone-polyol, and a polyurethane-polyol.

13. The resin composition for coating as described in claim 1, wherein the organic compound which serves as the component (B) is at least one compound selected from the group consisting of a polyurethane-diol, a polyester-diol and a modified polyolefin-polyol.

14. The resin composition for coating as described in claim 6, wherein the organic compound which serves as the component (B) is at least one compound selected from the group consisting of a polyurethane-diol, a polyester-diol and a modified polyolefin-polyol.

* * * * *